United States Patent [19]

Shipley

[11] 4,158,305
[45] Jun. 19, 1979

[54] METHOD FOR DYNAMICALLY TIMING AN APPARATUS

[75] Inventor: William W. Shipley, East Peoria, Ill.

[73] Assignee: Caterpillar Tractor Co., Peoria, Ill.

[21] Appl. No.: 892,447

[22] Filed: Mar. 31, 1978

[51] Int. Cl.² .......................................... G01M 15/00
[52] U.S. Cl. .................................. 73/119 A; 73/117.3; 324/16 T
[58] Field of Search ................... 73/116, 119 R, 119 A, 73/117.3; 324/16 T

[56] References Cited

U.S. PATENT DOCUMENTS

| | | | |
|---|---|---|---|
| 4,036,190 | 7/1977 | Bigliani et al. | 324/16 T X |
| 4,055,998 | 11/1977 | Pettingell et al. | 73/119 R |
| 4,081,995 | 4/1978 | Griffith et al. | 73/117.3 X |

Primary Examiner—Charles Gorenstein
Attorney, Agent, or Firm—John L. James

[57] ABSTRACT

A method is provided for dynamically timing an apparatus which includes cyclically generating reference and timing pulses. The method also includes counting the number of reference pulse per generating cycle; measuring a first timing fraction between a leading edge of the first timing pulse and a leading edge of the preceding reference pulse; measuring a second timing fraction between a leading edge of the second timing pulse and a leading edge of the preceding reference pulse; counting the number of whole reference pulses between the leading edges of the timing pulses; subtracting the first timing fraction from the count; and adding the second timing fraction to the count and producing a timing measurement.

6 Claims, 2 Drawing Figures

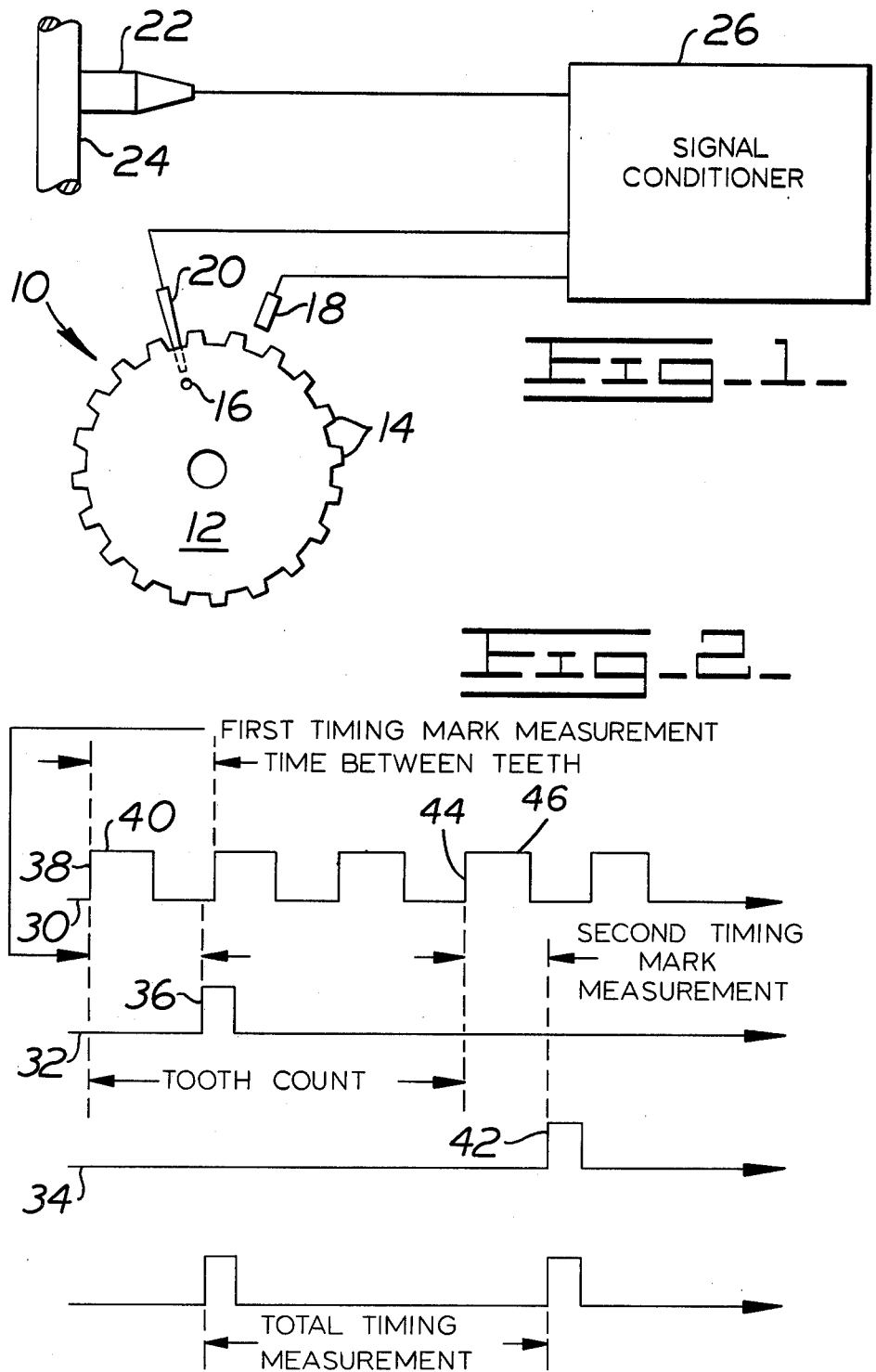

4,158,305

METHOD FOR DYNAMICALLY TIMING AN APPARATUS

BACKGROUND OF THE INVENTION

The present method is well suited for timing engines, particularly fuel injected engines such as diesel engines.

Many mechanisms, such as diesel engines for example, have parts which cooperate in time relation to produce optimum performance. An improperly timed engine wastes fuel and increases exhaust emissions. The energy crisis has helped create a need for increased fuel economy and environmental concern has increased the need to measure timing more accurately.

Conventional timing methods normally include attaching transducers to the engine or apparatus to be timed, generating first and second timing signals, and measuring the period between the timing signals. The second signal is normally representative of the top dead center position of the number one piston as indicated by a hole or slot in the flywheel which is connected to the crankshaft. The first signal occurs when a pressure pulse appears in the fuel line leading to the number one cylinder in a diesel engine or when a spark appears leading to the number one spark plug in a regular engine.

Measuring the period between the first and second signals produces an erroneous timing measurement because such measurement does not detect instantaneous changes in crankshaft speed caused by piston firing and crankshaft loads. Measuring the period between the timing marks assumes constant angular rotation of the crankshaft when torsionals of half a degree can occur on the crankshaft. Measuring the period between the timing signals requires greater resolution between the signals when large angles are to be measured. It is therefore desirable to have a timing method which detects instantaneous changes in crankshaft speed and which does not require increased resolution for measuring large angles.

SUMMARY OF THE INVENTION

The present invention is directed to overcoming one or more of the problems as set forth above.

According to the present invention, a timing method detects instantaneous changes in crankshaft speed and produces an accurate timing measurement. The method facilitates large timing measurements without the need for increased resolution.

BRIEF DESCRIPTION OF THE DRAWINGS

FIG. 1 is a diagrammatic view of an engine and apparatus for generating signals; and FIG. 2 is a diagrammatic view of the generated signals arranged to illustrate the timing method.

DETAILED DESCRIPTION

Referring to FIG. 1, an apparatus, such as a diesel engine 10 for example, cyclically generates a reference signal and at least first and second timing signals. The engine 10 has a flywheel 12 with a plurality of teeth 14 spaced about the periphery and a slot or hole 16. Transducers, such as magnetic pick up units 18,20 sense the teeth 14 and hole 16 and respectively generate the reference signal and second timing signal. A pressure transducer 22 is attached to a fuel injection line 24 and generates the first timing signal. The timing signals can be generated in other ways which are well known in the art.

The reference and timing signals are received by a signal conditioner 26 which produces reference pulses 30 and first and second timing pulses 32,34 (FIG. 2). Each reference pulse 30 represents one flywheel tooth 14.

The timing method includes counting the number reference pulses 30 for a generating cycle and obtaining the total tooth count. The time between a leading edge 36 of the first timing pulse 32 and a leading edge 38 of the preceding reference pulse 40 is measured and divided by the period of the reference pulse 40 to produce a first timing fraction. The time between a leading edge 42 of the second timing pulse 34 and a leading edge 44 of the preceding reference pulse 46 is measured and divided by the period of the reference pulse 46 to produce a second timing fraction. The number of whole reference pulses 30 between the leading edges 36,42 of the first and second timing pulses 32,34 is counted. The first timing fraction is substracted from the count and the second timing fraction is added to the count to produce a timing measurement in reference pulses 30.

Since there is a one to one correspondence between the reference pulses 30 and flywheel teeth 14, the timing measurement is also in flywheel teeth 14. In this manner, the resolution is always between two teeth, regardless of the number of teeth 14 separating the timing pulses 32,34. Since the resolution is always between two teeth, an accurate measurement is obtained, even over a large number of teeth 14.

Each timing measurement in reference pulses 30 is added to the preceding 31 timing measurements in reference pulses 30 and divided by 32 to produce and average timing measurement in reference pulses 30.

The timing measurement is divided by the total number of reference pulses 30 for a complete generating cycle and multiplied by 360 to produce a timing measurement in degrees of the generating cycle. In the engine 10, the timing measurement is in degrees of flywheel rotation or crankshaft rotation.

By measuring the first and second timing fractions, the resolution is always between two teeth 14 and the effect of torsional forces acting on the engine crankshaft and affecting crankshaft speed are accounted for in the timing measurement. Since the tooth count between the timing pulses 32,34 varies with speed, the torsionals appear in the tooth count and are used in the measurement. Because the timing measurement in teeth 14 is generally small compared with the total number of teeth, torsionals are instantaneously accounted for. By averaging each timing measurement with the preceding 31 measurements, an accurate, average timing measurement is obtained which can be converted to suitable form and displayed on conventional displaying equipment.

Other aspects, objects and advantages will become apparent from a study of the specification, drawings and appended claims.

The embodiments of the invention in which an exclusive property or privilege is claimed are defined as follows:

1. In a method for dynamically timing an apparatus which includes cyclically generating reference signal pulses and at least first and second timing pulses, the improvement comprising:

counting the number of pulses of the reference signal for a generating cycle;

measuring the time between a leading edge of the first timing pulse and a leading edge of the preceding reference pulse, dividing by the period of the reference pulse, and producing a first timing fraction;

measuring the time between a leading edge of the second timing pulse and a leading edge of the preceding reference pulse, dividing by the period of the reference pulse, and producing a second timing fraction;

counting the number of whole reference pulses between the leading edges of the first and second timing pulses;

subtracting the first timing fraction from the count; and adding the second timing fraction to the count and producing a timing measurement in reference signal pulses.

2. A method, as set forth in claim 1, including dividing the timing measurement by the total number of reference signal pulses per generating cycle, multiplying by 360 and producing a timing measurement in degrees of the generating cycle.

3. A method, as set forth in claim 1, including adding the timing measurement in reference signal pulses to the preceding 31 timing measurements, dividing by 32 and producing an average timing measurement in reference signal pulses.

4. A method for digitally, dynamically timing an engine, comprising:

connecting a transducer to a toothed flywheel of the engine and generating reference pulses in response to movement of the flywheel teeth;

generating at least first and second timing pulses;

counting the number of teeth on the flywheel;

measuring the time between a leading edge of the first timing pulse and a leading edge of the preceding reference pulse, dividing by the period of the reference pulse, and producing a first timing fraction;

measuring the time between a leading edge of the second timing pulse and a leading edge of the preceding reference pulse, dividing by the period of the reference pulse, and producing a second timing fraction;

counting the number of whole reference pulses between the leading edges of the first and second timing pulses;

subtracting the first timing fraction from the count; and adding the second timing fraction to the count and producing a timing measurement in numbers of flywheel teeth.

5. A method as set forth in claim 4, including dividing the timing measurement by the total number of flywheel teeth, multiplying by 360 and producing a timing measurement in degrees of flywheel rotation.

6. A method, as set forth in claim 4, including adding the timing measurement in flywheel teeth to the preceding 31 timing measurements in flywheel teeth, dividing by 32 and producing an average timing measurement in flywheel teeth.

* * * * *